(No Model.) 2 Sheets—Sheet 1.

T. M. HOVELL.
ANIMAL TRAP.

No. 583,377. Patented May 25, 1897.

Witnesses
Inventor Thomas M. Hovell
by James L. Norris
Attorney

THE NORRIS PETERS CO., PHOTO-LITHO., WASHINGTON, D. C.

(No Model.) 2 Sheets—Sheet 2.
T. M. HOVELL.
ANIMAL TRAP.
No. 583,377. Patented May 25, 1897.
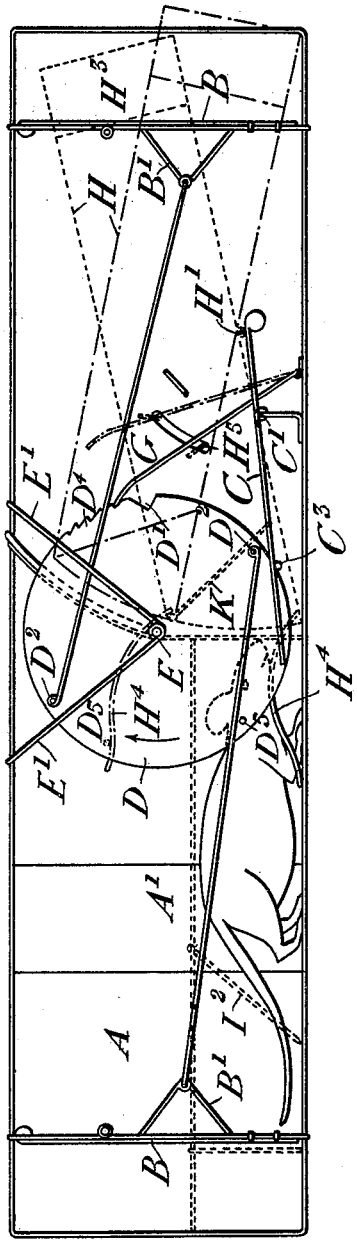
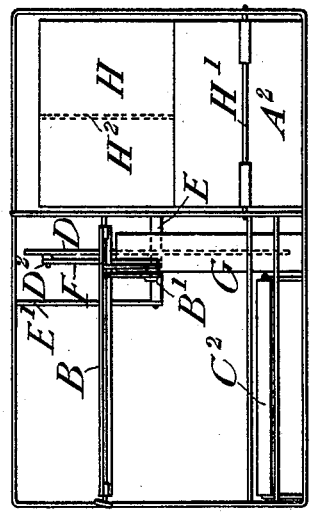
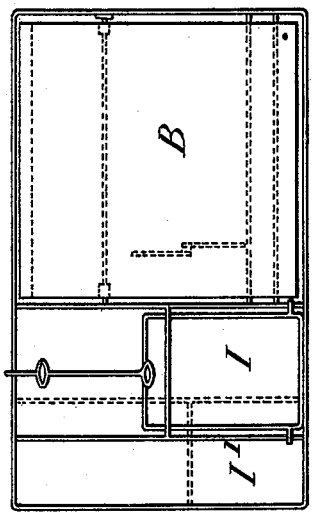
Witnesses
Inventor Thomas M. Hovell
by James L. Norris
Attorney

UNITED STATES PATENT OFFICE.

THOMAS M. HOVELL, OF ELSTREE, ENGLAND.

ANIMAL-TRAP.

SPECIFICATION forming part of Letters Patent No. 583,377, dated May 25, 1897.

Application filed January 14, 1897. Serial No. 619,257. (No model.)

*To all whom it may concern:*

Be it known that I, THOMAS MARK HOVELL, a citizen of England, residing at Boreham Holt, Elstree, in the county of Hertford, England, have invented certain new and useful Improvements in Animal-Traps, of which the following is a specification.

My invention relates to that kind of animal-traps in which an animal on entering is made to depress a treadle, whereby entrance-doors that were held open are made to close, and are locked in that position, after which the animal in passing into another compartment actuates a device by means of its weight, whereby the doors are opened and set ready for another animal to enter.

I will describe my improved construction of such traps with reference to the accompanying drawings, in which—

Figure 1:
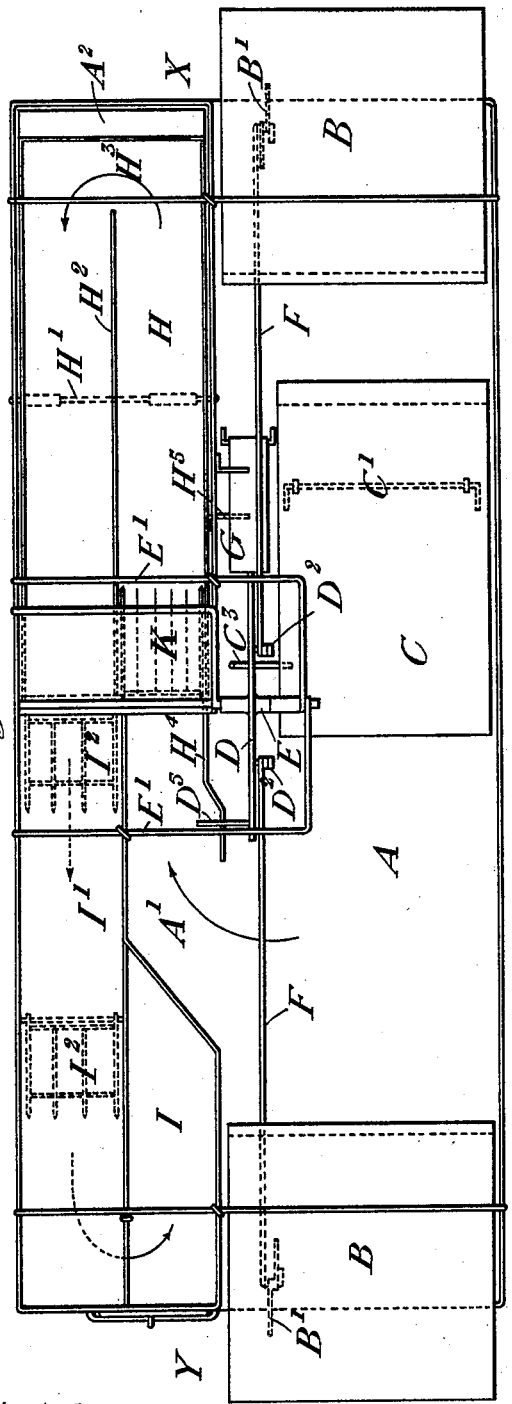
Figure 2:
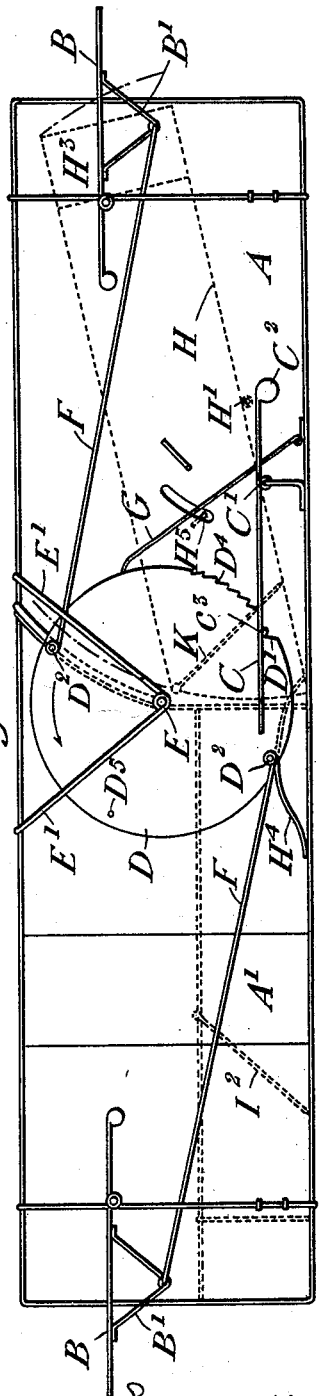

Figure 1 shows a plan of the trap with the top plate removed. Fig. 2 shows a front elevation with the doors open, the outer side being removed. Fig. 3 shows the same view with the doors closed. Fig. 4 shows an end view at X, Fig. 1, with the doors open; and Fig. 5 shows an end view at Y with the doors closed.

The trap, which may either be of wire or of other suitable material, has a front compartment A, the two open ends of which can be closed by pivoted doors B, which when open are in the horizontal position shown at Figs. 1 and 2 and when in the closed position are vertical, as at Fig. 3.

The compartment contains a treadle C, pivoted at C', and which, when the trap is set, is held in the raised position (shown at Fig. 2) by a counterweight $C^2$, which keeps a pin $C^3$, projecting therefrom, engaged with a notch D' in a rotatable disk D, mounted loose on a spindle E, carried by arms E' from the top of the trap. This disk has two pins $D^2$, projecting from it at diametrically opposite points, to which are connected the one end of two connecting-rods F, whose other ends are pivoted to wire loops B' on the doors, so that when the disk D is locked in the position at Fig. 2 by the pin of the pedal it holds the doors in the open position. The disk D is furthermore provided with ratchet-notches $D^4$ at one part of its periphery, with which engages a pivoted pawl G when the disk is turned into a corresponding position, as at Fig. 3, and it will be seen that when in this position the disk D holds the doors B locked in the closed position by means of the rods F, as the pawl G then prevents the disk from turning in the direction in which the pull of the rods is exercised.

The compartment A communicates by a side passage A' with the open end of a box-shaped rocking frame H, pivoted at H' in a compartment $A^2$ and so arranged that it tends to remain in the upward sloping position shown in dotted lines at Figs. 2 and 3. This frame is divided by a middle longitudinal partition $H^2$ into two longitudinal passages which communicate with each other at the upper end by an opening $H^3$, the one passage communicating at its lower end through a flap-door K with the before-mentioned side passage A', while the other communicates with the passage I' with flap-doors $I^2$, leading into the compartment I. At its lower end the rocking frame H has a projecting arm $H^4$, which, when the frame is rocked on its pivots, so as raise the lower end, strikes against a pin $D^5$, projecting from the back of the disk D, and thereby turns this through part of a revolution. The frame has also a laterally-projecting pin $H^5$, which, when the lower end of the frame rises, comes in contact with the pawl G, so as to lift this out of gear with the ratchet-notches of D before this is acted upon by the arm $H^4$.

The action of the trap constructed as above described is as follows: When the trap is set, as at Fig. 2, the disk D being then in the position in which the pin $C^3$ of the platform C is engaged with the notch D', the pins $D^2$ are in such a position that the rods F hold the doors B open in the horizontal position. On an animal entering and depressing the treadle C the disk D is freed from the pin $C^3$, and the doors, being no longer held thereby, will drop into the closed position, thereby causing the rods F to turn the disk D in the direction of the arrow, Fig. 2. By this motion the ratchet-notches $D^4$ are brought up to the pawl G, which in engaging therewith, as at Fig. 3, prevents any turning back of the disk, and consequently locks the doors in the closed position, so that the animal cannot escape. The latter then passes through passage A' into the one passage of the frame H, and in running up this causes the frame to tilt over into the dot-and-dash position, Fig. 3. By this motion the pawl G is first raised out of gear with D, as described, after which the arm H⁴ in rising comes in contact with the pin D⁵ and turns the disk D back in the direction of the arrow, Fig. 3, into its original position, thereby causing the rods F to open the doors again. In this position they are again secured by the pin C³ of the treadle C in rising entering the notch D' of D, so that the trap is thus reset. Meanwhile the animal will have passed through opening H³ into the second passage of H and in running up the same will cause the frame to tilt back into its original position, when the animal on passing on through passage I' will enter the compartment I, where it is retained.

Having thus described the nature of this invention and the best means I know for carrying the same into practical effect, I claim—

1. In an animal-trap, the combination with a compartment A of pivoted doors B connected by rods to a rotatable disk D which in one position, in which it keeps the doors open, is held by means of a pin or equivalent device on a pivoted balanced platform C, engaging with a notch D' on the disk while in another position of the disk in which it holds the doors closed, it is held by a pawl G engaging with ratchet-notches D⁴ thereon, substantially as described.

2. In an animal-trap, the combination of a rotatable disk D connected by rods to doors B, a pivoted treadle C locking said disk in a position in which it holds the doors open, a pawl G locking said disk in a position in which it holds the doors closed, and a rocking frame H which when tilted over from one position to another by the weight of an animal, first disengages the pawl G from the disk D, and then effects the turning of the disk so as to bring the doors into the open position, substantially as described.

In testimony whereof I have signed my name to this specification, in the presence of two subscribing witnesses, this 1st day of January, A. D. 1897.

THOMAS M. HOVELL.

Witnesses:
   OLIVER IMRAY,
   JNO. P. M. MILLARD.